United States Patent
Lin et al.

(10) Patent No.: US 7,498,705 B2
(45) Date of Patent: Mar. 3, 2009

(54) ROTOR

(75) Inventors: Shih-Kai Lin, Taoyuan Hsien (TW);
Huan-Chi Chen, Taoyuan Hsien (TW);
Te-Tsai Chuang, Taoyuan Hsien (TW);
Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/165,124

(22) Filed: Jun. 24, 2005

(65) Prior Publication Data
US 2006/0208590 A1    Sep. 21, 2006

(30) Foreign Application Priority Data
Mar. 18, 2005    (TW)    .............................. 94108345 A

(51) Int. Cl.
*H02K 5/00*    (2006.01)
(52) U.S. Cl. ........................................................ 310/91
(58) Field of Classification Search .................. 310/91, 310/67 R, 156.26, 156.59
See application file for complete search history.

(56) References Cited

U.S. PATENT DOCUMENTS

| 4,564,335 | A | * | 1/1986 | Harmsen et al. | ......... 415/218.1 |
|---|---|---|---|---|---|
| 4,682,065 | A | * | 7/1987 | English et al. | ............... 310/90 |
| 5,258,672 | A | * | 11/1993 | Wrobel | ......................... 310/42 |
| 5,973,428 | A | * | 10/1999 | Zakrocki et al. | .............. 310/71 |
| 6,426,576 | B1 | * | 7/2002 | Varenne | .................. 310/156.09 |
| 6,462,441 | B1 | * | 10/2002 | Horng et al. | ............... 310/67 R |
| 6,501,200 | B2 | * | 12/2002 | Engel et al. | ................ 310/68 R |
| 6,713,907 | B2 | * | 3/2004 | Matsumoto | ............... 310/67 R |
| 2004/0012289 | A1 | | 1/2004 | Gross et al. | |

FOREIGN PATENT DOCUMENTS

| DE | 1 038 642 | 9/1958 |
|---|---|---|
| DE | 37 07 600 A1 | 9/1988 |
| DE | 695 11 161 T2 | 3/2000 |
| GB | 2 393 585 A | 3/2004 |

* cited by examiner

*Primary Examiner*—Nguyen N Hanh
(74) *Attorney, Agent, or Firm*—Birch, Stewart, Kolasch & Birch, LLP

(57) ABSTRACT

A rotor. The rotor includes a case, a reinforcing part, a shaft and a connecting element. The reinforcing part is formed with the case and defines an opening. The shaft extends into the opening. The connecting element connects the case and the shaft, with the reinforcing part disposed inside.

21 Claims, 5 Drawing Sheets

ROTOR

BACKGROUND

The invention relates to a rotor, and in particular, to a rotor with enhanced mechanical strength to be used in the fan.

In a conventional rotor, the shaft and the case are connected as follows.

FIG. 1 depicts a rotor assembled by insert molding, wherein a shaft 20 is disposed in contact with a joining area 11 of a case 10, and then a connecting material (e.g. plastic or soft metal) 30 is provided between the shaft 20 and the case 10 by insert molding. Thus, the shaft 20 is firmly connected to the case 11.

FIG. 2 depicts another rotor assembled by fitting-and-riveting, wherein a shaft 20 is fitted into a copper cover 40, and then the copper cover 40 and the case 10 are connected by riveting (i.e. the copper cover 40 is passed through an opening 12 of a case 10, and the part of the copper cover 40 projecting from the opening 12 is flattened by pressing).

The described methods of assembling the rotor have their respective drawbacks; for insert molding, the parts of the case 10 and the shaft 20 embedded in the connecting material 30 are small. During rotation, therefore, the shaft 20 or/and the connecting material 30 may separate from the case 10 due to insufficient rigidity of the case 10. Furthermore, connection via riveting has poor resistance to vibration. For fitting-and-riveting, therefore, the riveted part of the copper cover 40 may be broken during rotation so that the shaft 20 and the case 10 separate, particularly when the rotor is heavy or metal fatigue occurs.

In conclusion, the described methods of assembling the rotor fail to maintain the connection between the shaft and the case after long-term use. Thus, the application of the fan is limited. Frequent maintenance and replacement of parts of the rotor are unavoidable. The fans, produced by the described methods, fail to meet the demand of the manufacturing industry and the consumers for endurance of products. An improvement of the described rotors is necessary.

SUMMARY

To solve the described problems, the invention provides a rotor with the shaft and the case firmly connected, thereby promoting the reliability and endurance thereof.

A rotor in accordance with an exemplary of the invention includes a case, a reinforcing part, a shaft and a connecting element. The reinforcing part is formed with the case and defines an opening. The shaft extends into the opening. The connecting element connects the case and the shaft, with the reinforcing part disposed inside, whereby the connection between the shaft, the connecting element and the case is stronger, such that separation therebetween is less likely, and the reliability and endurance of the rotor is promoted.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
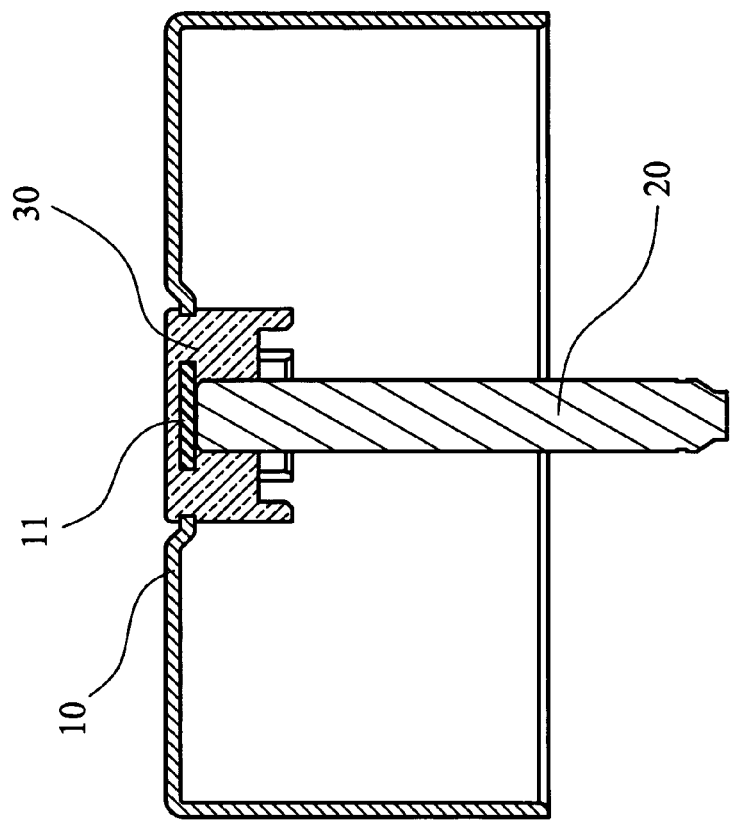
FIG. 1 is a sectional view of a rotor introduced in the background of the invention.
Figure 2:
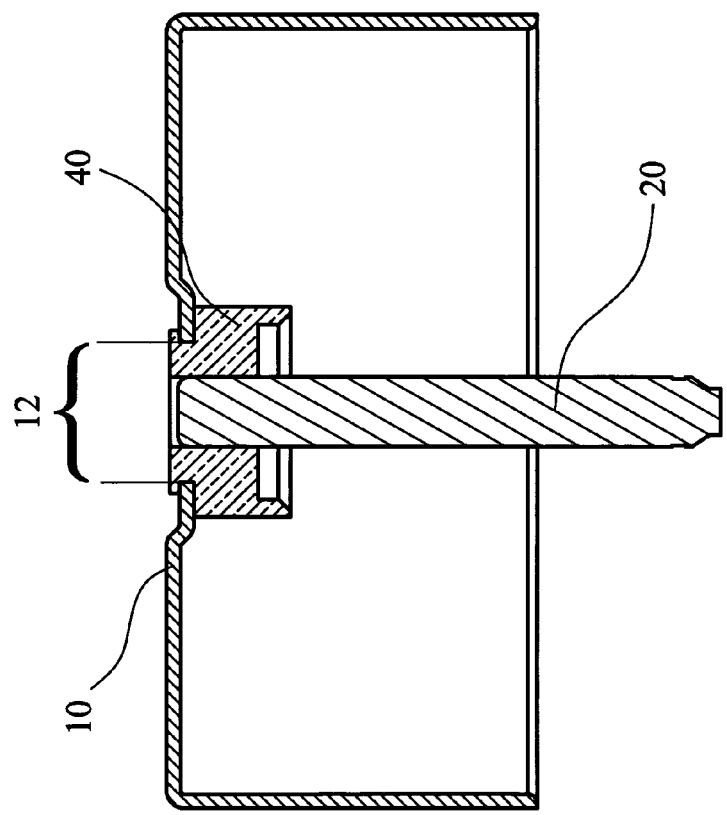
FIG. 2 is a sectional view of another rotor introduced in the background of the invention.
Figure 3C:
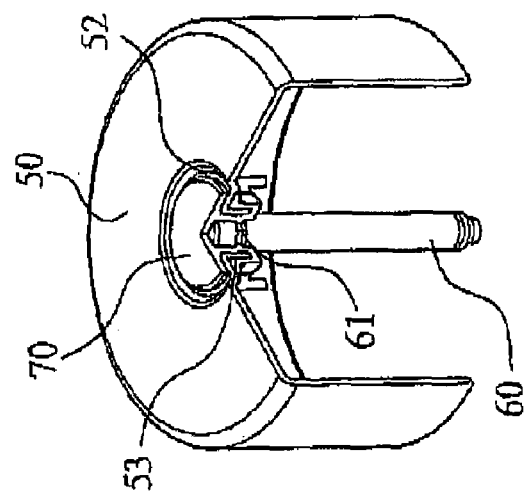
FIGS. 3A-3C show the process of assembling a rotor which comprises a case and a shaft.
Figure 3B:
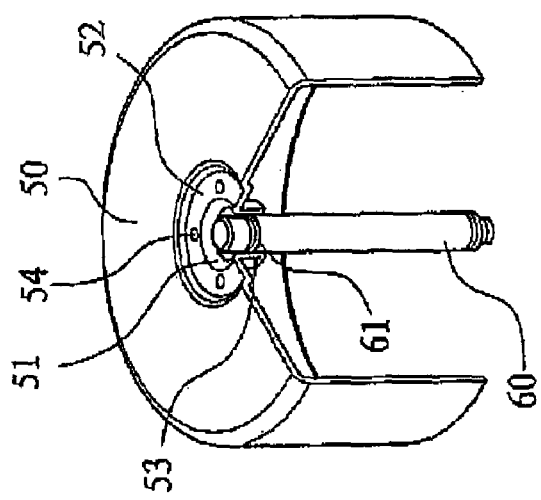
Figure 3A:
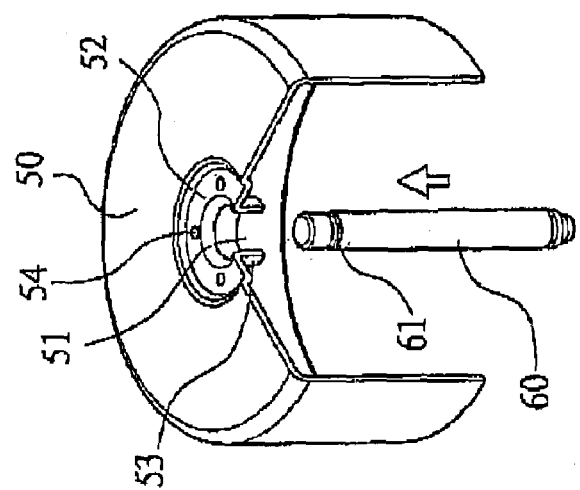
Figure 4:
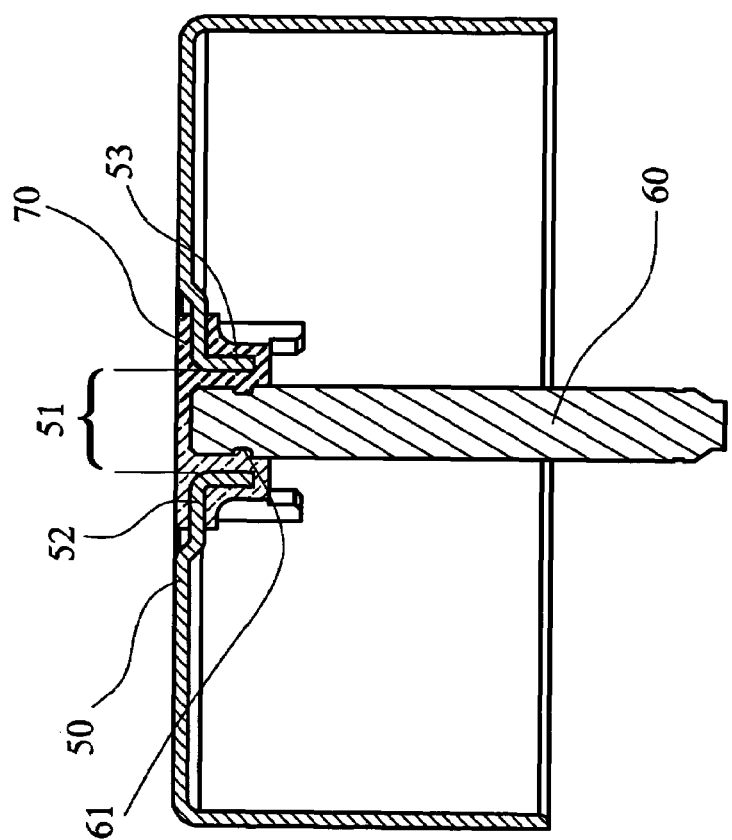
FIG. 4 is a sectional view of FIG. 3C.

Please refer to FIGS. 3A, 3B, 3C and 4, wherein FIGS. 3A, 3B and 3C show the process of assembling a rotor which comprises a case and a shaft, and FIG. 4 is a sectional view of FIG. 3C.

Referring to FIG. 3A, the case 50 is the main part of the rotor. In this embodiment, the case 50 has a circular cross section. An opening 51 is provided in the center of the bottom of the case 50 for receiving the shaft 60.

The case 50 has a recessed supporting part 52 near the opening 51. The supporting part 52 is annular and has at least a hole 54. A reinforcing part 53 extends from the supporting part 62 into the case 50.

Figure 5:
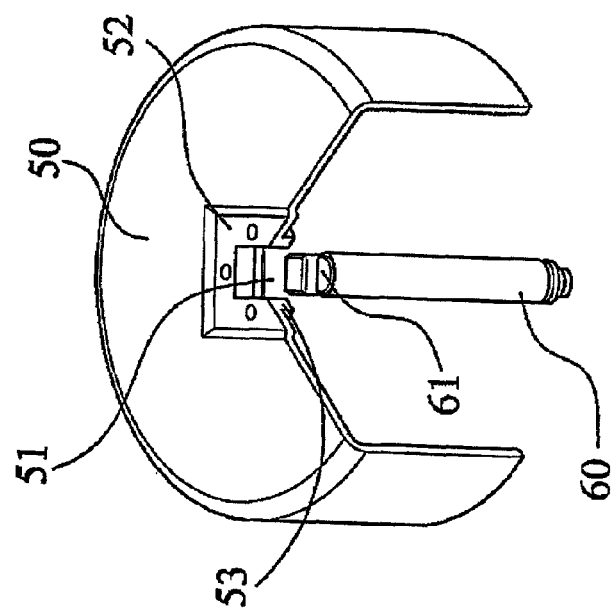
FIG. 5 shows another shape of the supporting part and the opening.

It is understood that the cross section of the case 50 can be circular, polygonal or similar. The opening 51 can be circular, polygonal or similar. The supporting part 52, shaped to match the case 50 and the opening 51, is correspondingly circular, polygonal or similar. As shown in Fig.5, the supporting part 52 of the case 50 is polygonal, and the shape of the opening 51 matches the supporting part 52.

The case 50 is made of metal, plastic or alloy. Furthermore, the case 50 is formed by pressing or is integrally formed.

The reinforcing part 53 extends at a 90° angle (FIG. 3A) from the case 50. The angle, however, can be 45° (not shown) or any other easily machined.

Referring again to FIGS. 3B and 3C, the shaft 60 has an end in the opening 51 of the case 50. A groove 61 is circumferentially provided on the end of the shaft 60. A connecting element 70 is provided between the shaft 60 and the cast 50 by insert molding. The connecting element 70 comprises plastic or soft metal (e.g. aluminum, zinc or an alloy of aluminum and magnesium), so that the connecting element 70 can be forced into the hole 54 during insert molding to firmly connect the case 50 and the shaft 60.

The end of the shaft 60 in the opening 51 can have a polygonal cross section, be cylindrical, or shaped like a pillar having concave/convex side surfaces for reinforcing the connection between the shaft 60 and the connecting element 70. It is noted that any shape of the end is acceptable during the formation of the connecting element 70 by insert molding.

Referring to FIG. 4, the connecting element 70 completely covers the reinforcing part 53, partially covers the supporting part 52, and fully occupies the groove 61 of the shaft 60 and the gap between the reinforcing part 53 and the shaft 60.

The invention provides a reinforcing part 53 to improve the mechanical strength of the connecting element 70. In addition, the connecting element 70 is supported by both the reinforcing part 53 and the supporting part 52. Therefore, separation of the connecting element 70 from the case 50 due to insufficient rigidity can be avoided. Furthermore, fixing of the shaft 60 by the connecting element 70 becomes stronger due to the reinforcing part 53. Thus, the fan is more reliable during operation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotor comprising:
   a case;
   a reinforcing part formed with the case and defining an opening;
   a shaft extending into the opening, wherein the reinforcing part is non-perpendicular to the shaft;
   a connecting element connecting the case and the shaft wherein the reinforcing part is completely embedded into the connecting element;
   a recessed supporting part connected between the case and the reinforcing part; and
   at least one hole penetrating through the recessed supporting part and formed adjacent to the opening.

2. The rotor as claimed in claim 1, wherein the reinforcing part extends at a 45° or 90° angle from the recessed supporting part.

3. The rotor as claimed in claim 1, wherein the connecting element comprises plastic.

4. The rotor as claimed in claim 1, wherein the connecting element comprises metal.

5. The rotor as claimed in claim 4, wherein the metal is aluminum, zinc or an alloy of aluminum and magnesium.

6. The rotor as claimed in claim 1, wherein the recessed supporting part is circular.

7. The rotor as claimed in claim 1, wherein the recessed supporting part is polygonal.

8. The rotor as claimed in claim 1, wherein the reinforcing part is formed by pressing.

9. The rotor as claimed in claim 1, wherein the reinforcing part, the recessed supporting part and the case are integrally formed by injection molding.

10. The rotor as claimed in claim 1, wherein the shaft comprises an end in the opening, and the end is cylindrical.

11. The rotor as claimed in claim 1, wherein the shaft comprises an end in the opening, and a groove is circumferentially provided on the end of the shaft.

12. The rotor as claimed in claim 1, wherein the shaft comprises an end in the opening, and the end has a polygonal cross section.

13. The rotor as claimed in claim 1, wherein the opening is circular.

14. The rotor as claimed in claim 1, wherein the opening is polygonal.

15. The rotor as claimed in claim 1, wherein the connecting element extends into the at least one hole.

16. The rotor as claimed in claim 1, wherein the at least one hole formed in the recessed supporting part includes a plurality of holes spaced apart from each other in equal intervals in a radial direction around the shaft.

17. A rotor comprising:
    a case;
    a reinforcing part formed with the case and defining an opening;
    a shaft extending into the opening;
    a connecting element connecting the case and the shaft wherein the reinforcing part is completely embedded into the connecting element and the reinforcing part extends from the case along a direction in parallel to an axial line of the shaft;
    a recessed supporting part connected between the case and the reinforcing part; and
    at least one hole penetrating through the recessed supporting part and positioned adjacent to the opening.

18. The rotor as claimed in claim 17, wherein the case, the recessed supporting part and the reinforcing part are integrally formed as a monolithic piece.

19. The rotor as claimed in claim 17, wherein the shaft comprises an end in the opening, and a groove is circumferentially provided on the end of the shaft.

20. The rotor as claimed in claim 17, wherein the connecting element comprises at least one of plastic, aluminum, zinc, or an alloy of aluminum and magnesium.

21. A rotor comprising:
    a case;
    a reinforcing part formed with the case and defining an opening;
    a shaft extending into the opening, wherein the reinforcing part is non-perpendicular to the shaft;
    a connecting element connecting the case and the shaft wherein the reinforcing part is completely embedded into the connecting element;
    a recessed supporting part; and
    at least one hole penetrating through the recessed supporting part,
    the at least one hole being covered on both ends thereof by the connecting element,
    wherein the at least one hole formed in the recessed supporting part includes a plurality of holes apart from each other in equal intervals in a radial direction around the shaft.

* * * * *